United States Patent
Staudt et al.

(10) Patent No.: US 9,533,557 B2
(45) Date of Patent: Jan. 3, 2017

(54) RECREATIONAL VEHICLE ROOFTOP SHADE SYSTEM

(71) Applicants: Robert Joseph Staudt, La Vernia, TX (US); Brian Joseph Staudt, La Vernia, TX (US)

(72) Inventors: Robert Joseph Staudt, La Vernia, TX (US); Brian Joseph Staudt, La Vernia, TX (US)

(*) Notice: Subject to any disclaimer, the term of this patent is extended or adjusted under 35 U.S.C. 154(b) by 9 days.

(21) Appl. No.: 14/024,471

(22) Filed: Sep. 11, 2013

(65) Prior Publication Data

US 2015/0068692 A1 Mar. 12, 2015

(51) Int. Cl.
*B60J 11/04* (2006.01)

(52) U.S. Cl.
CPC ...................... *B60J 11/04* (2013.01)

(58) Field of Classification Search
CPC .................... B60J 11/04; B60J 11/00
USPC ......... 160/368.1, 370.21; 150/166; 135/88.1, 135/88.07; 296/100.11, 100.12, 100.13, 100.15, 296/100.16, 100.18, 136.1, 136.11
See application file for complete search history.

(56) References Cited

U.S. PATENT DOCUMENTS

| | | | | |
|---|---|---|---|---|
| 2,571,362 A * | 10/1951 | Hervey | ........................... | 135/134 |
| 2,646,097 A * | 7/1953 | Gaverth et al. | ............... | 150/166 |
| 2,751,977 A * | 6/1956 | Pinkerton | .................. | 160/368.1 |
| 2,801,667 A * | 8/1957 | Curran | ........................... | 150/166 |
| 2,948,288 A * | 8/1960 | Nelson | .......................... | 135/88.1 |
| 4,075,723 A * | 2/1978 | Bareis et al. | ................. | 114/361 |
| 4,944,551 A * | 7/1990 | Hardy, Jr. | ................ | 296/100.12 |
| 5,029,933 A * | 7/1991 | Gillem | ..................... | 296/136.11 |
| 5,806,873 A * | 9/1998 | Glassman | .................... | 280/507 |
| 6,010,176 A * | 1/2000 | Jones | ....................... | 296/100.16 |
| 6,220,263 B1 * | 4/2001 | Randmae | ........................ | 135/87 |
| 6,415,832 B1 * | 7/2002 | Ricks | ............................ | 150/166 |
| 6,427,709 B1 * | 8/2002 | Montes | ...................... | 135/88.07 |
| 6,505,879 B1 * | 1/2003 | Arviso | ..................... | 296/100.18 |
| 6,779,827 B2 * | 8/2004 | Clark | ............................. | 296/98 |
| 7,104,591 B1 * | 9/2006 | Sanns | ........................ | 296/180.1 |
| 7,883,103 B1 * | 2/2011 | Greaves, Jr. | .................. | 280/507 |
| 9,004,088 B1 * | 4/2015 | Nicheporuck | ................ | 135/115 |
| 2005/0011547 A1 * | 1/2005 | Herndon et al. | ........... | 135/88.07 |
| 2007/0194598 A1 * | 8/2007 | Perniciaro | ................ | 296/136.08 |

* cited by examiner

*Primary Examiner* — David Purol
(74) *Attorney, Agent, or Firm* — John C. Cave; Gunn, Lee & Cave, PC

(57) ABSTRACT

The present invention relates to a novel rooftop shading system for recreational vehicles (RVs) and a method of installing the same. The shading system comprises a sheet of material generally sized to cover the roof of an RV. The sheet is supported over the roof with support rods which extend across the width of the roof and maintain a curved shape of the sheet. The sheet is secured to the RV by two strap systems which extend from the front end and rear end of the sheet. This system allows the sheet to be secured to and elevated from the roof of the RV providing space and producing shade to the rooftop of the trailer body or RV.

11 Claims, 10 Drawing Sheets

RECREATIONAL VEHICLE ROOFTOP SHADE SYSTEM

BACKGROUND OF THE INVENTION

1. Field of the Invention

The present invention relates generally to shading systems for recreational vehicles (RVs). More particularly, the present invention concerns a shade cover which can be secured to an RV and which extends over a roof of the RV to protect the roof from the sun's harmful ultraviolet rays and to provide a cooling effect for the roof.

2. Description of the Related Art

RVs give people the freedom to travel to a desired destination without having to make separate travel and accommodation arrangements. Once at a desired destination, the RV is parked for a period of time while the travelers enjoy their stay. The specific location where an RV is parked can range from rustic facilities to luxury resorts. Many times the RV will be parked at an "RV park," which is an area specifically dedicated to RV travelers and RV parking, or, the RV may simply be parked in random locations such as a beach, a national park, or any other area where RV parking is allowed.

Regardless of the specific location, once parked, the RV typically remains there for some time. The duration of stay varies and many times extends over a substantial period of time. Although some RV parks have covered stalls, the RV is usually parked in an area with limited or no shading and the RV is continually exposed to the sun during daylight hours. With the sun bearing down, the RV suffers deleterious effects such as ultraviolet (UV) degradation. Various components on the roofs are commonly made from plastic or similar materials and are particularly susceptible to the UV degradation. Additionally, the roof of the RV heats up as it is continually exposed throughout the daylight hours. Therefore, there is a need for a shade system to shield the RV roof from the sun and to provide a cooling effect while the RV remains parked.

BRIEF SUMMARY OF THE INVENTION

The present invention is directed to a rooftop shade system for RV roofs. The rooftop shade system is formed with an RV and a novel shade cover extending over the RV. The RV is accepted as the type of RV that is towed behind a vehicle. It has trailer body with a front end, a rear end, opposing sides extending between the two ends, and a roof. A trailer tongue extends from the front end and a bumper is at the rear end. It is anticipated that this invention could be adapted to shade the roof of a drive-back motorhome.

The shade cover is a sheet of material in a generally curved shape. When in place, it has a concave lower surface that faces the roof of the trailer body and convex upper surface opposite of the lower surface. At least one support rod, and preferably a plurality of support rods, extends along the concave surface of the sheet in a direction generally lateral to the length of the roof. Each support rod is attached to the sheet at first and second rod attachment locations and may extend through a sleeve affixed to the concave surface of the sheet between the rod attachment locations. When in place, the support rods are curved and maintain the curved shape of the sheet, which allows at least a portion of the sheet to be elevated from the roof of the trailer body. Preferably, the supports rods are flexible but have resilience so that when the rods are bent they will return to their unbent state unless prevented from doing so.

One or more straps are affixed to the sheet at first and second strap attachment locations and extend under the concave surface of the sheet. Preferably, the first and second strap attachment locations are on the convex upper surface of the sheet and the straps extend around side boundaries of the sheet; however, the first and second strap attachment locations may be elsewhere on the sheet. Preferably, each strap is comprised of two lengths connected to each other with a buckle or similar connecting means. The straps are sized so that they pull the first and second side boundaries of the sheet toward each other and, therefore, cause the support rods to have a curved bend.

A first stability strap system and a second stability strap system secure the curved sheet to the trailer so that wind does not carry it away. It has been shown that these stability straps will also hold curved sheet in place while the RV is moving. The first stability strap system has one or more strap members affixed or otherwise secured to a front end of the sheet while the second stability strap system has one or more strap members affixed or otherwise secured to the rear end of the sheet. The first stability strap system attaches to the trailer tongue and the second stability strap system attaches to the rear bumper. Preferably, the first and second stability strap systems each incorporates a ratchet connection or some other connection that enables tightening of the sheet against the rooftop as further described herein below.

DETAILED DESCRIPTION OF THE INVENTION

Figure 1:
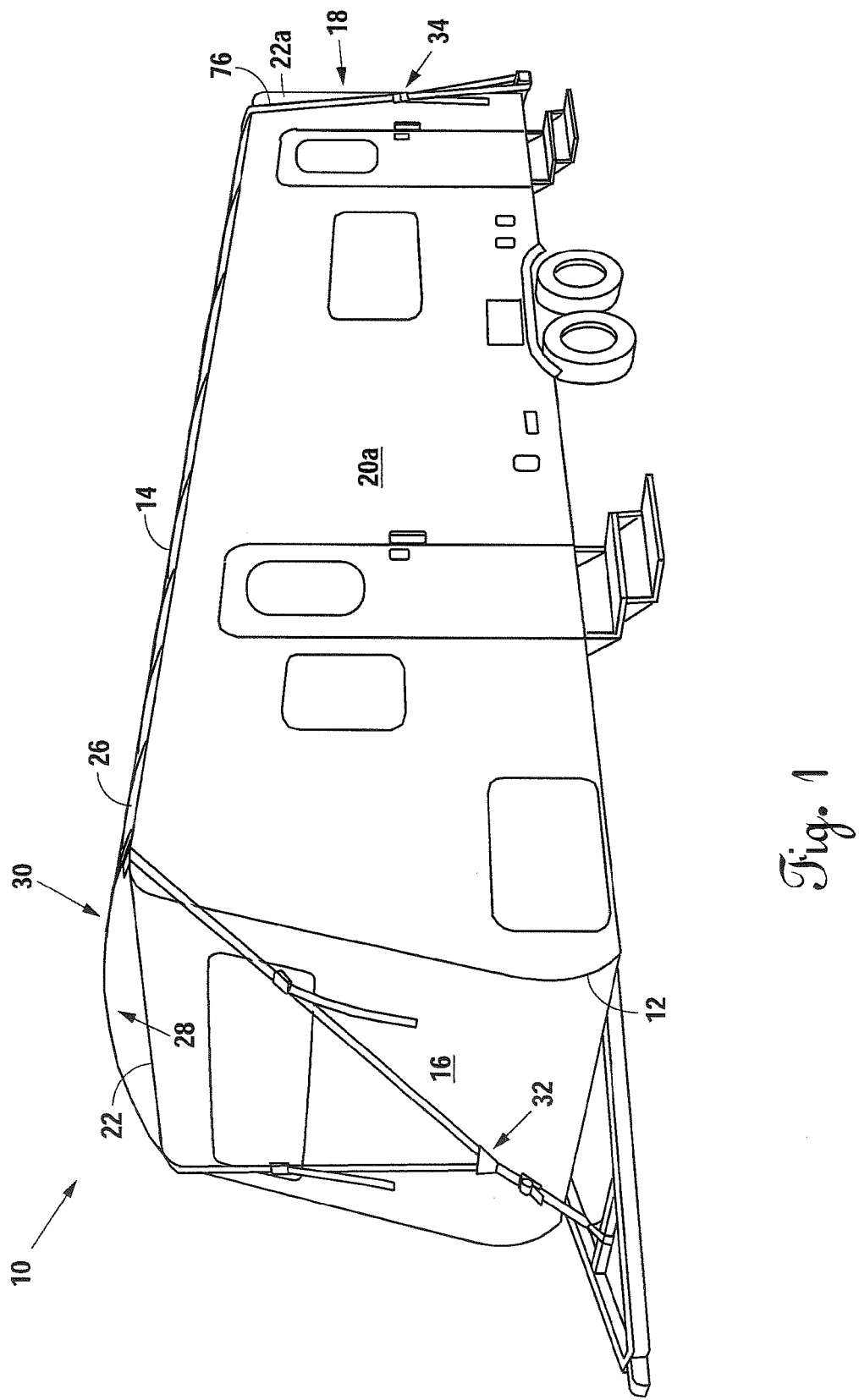
FIG. 1 is a perspective view of the preferred embodiment of the present invention secured to an RV.
Figure 10:
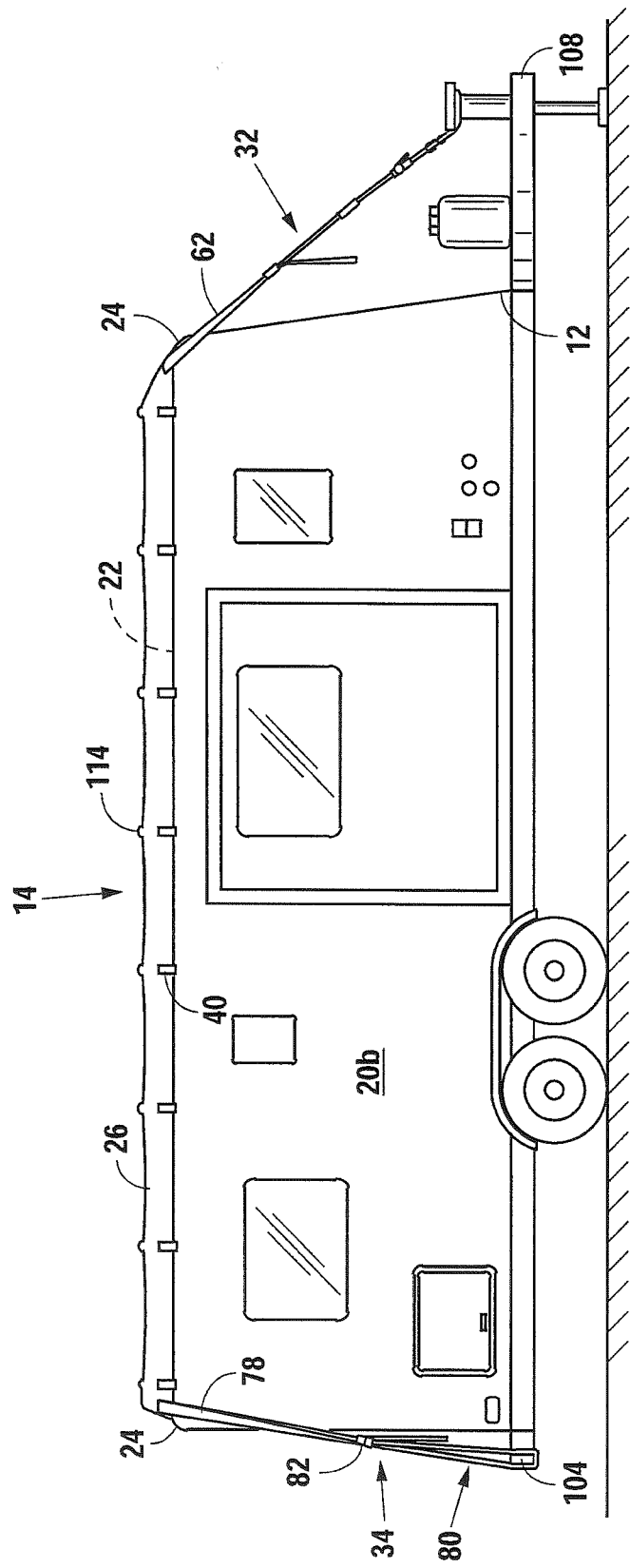
FIG. 10 is a side elevation view of the present invention after installation is complete.

Referring to FIG. 1, the preferred embodiment of a recreational vehicle rooftop shade system 10 is shown. The system 10 generally comprises a trailer body 12 with a shade cover 14 secured to it. The trailer body 12 has a front end 16 and a rear end 18 opposite the front end 16. Opposing sides of the trailer body 12 extend between the front and rear ends 16, 18. A first side 20a of the opposing sides is shown in FIG. 1 while a second side 20b of the opposing sides is shown in FIG. 10.

Referring back to FIG. 1, the shade cover 14 extends over the roof 22 of the trailer body 12. The shade cover 14 has a sheet 26 in a generally curved shape which provides shade for the roof 22. The curved shape of the sheet 26 has a concave lower surface 28 that faces the roof 22 and a convex upper surface 30 opposite the lower surface 28. The curved shape causes the sheet 26 to be elevated from the roof 22 of the trailer body 12, with the largest degree of elevation being at the apex of the concave surface 28. Due to the elevation, however, the shade cover 24 is at risk of being windblown from the roof 22 and, therefore, a first stability strap system 32 and a second stability strap system 34 are employed to secure the shade cover 24 to the trailer body 12.

Figure 2:
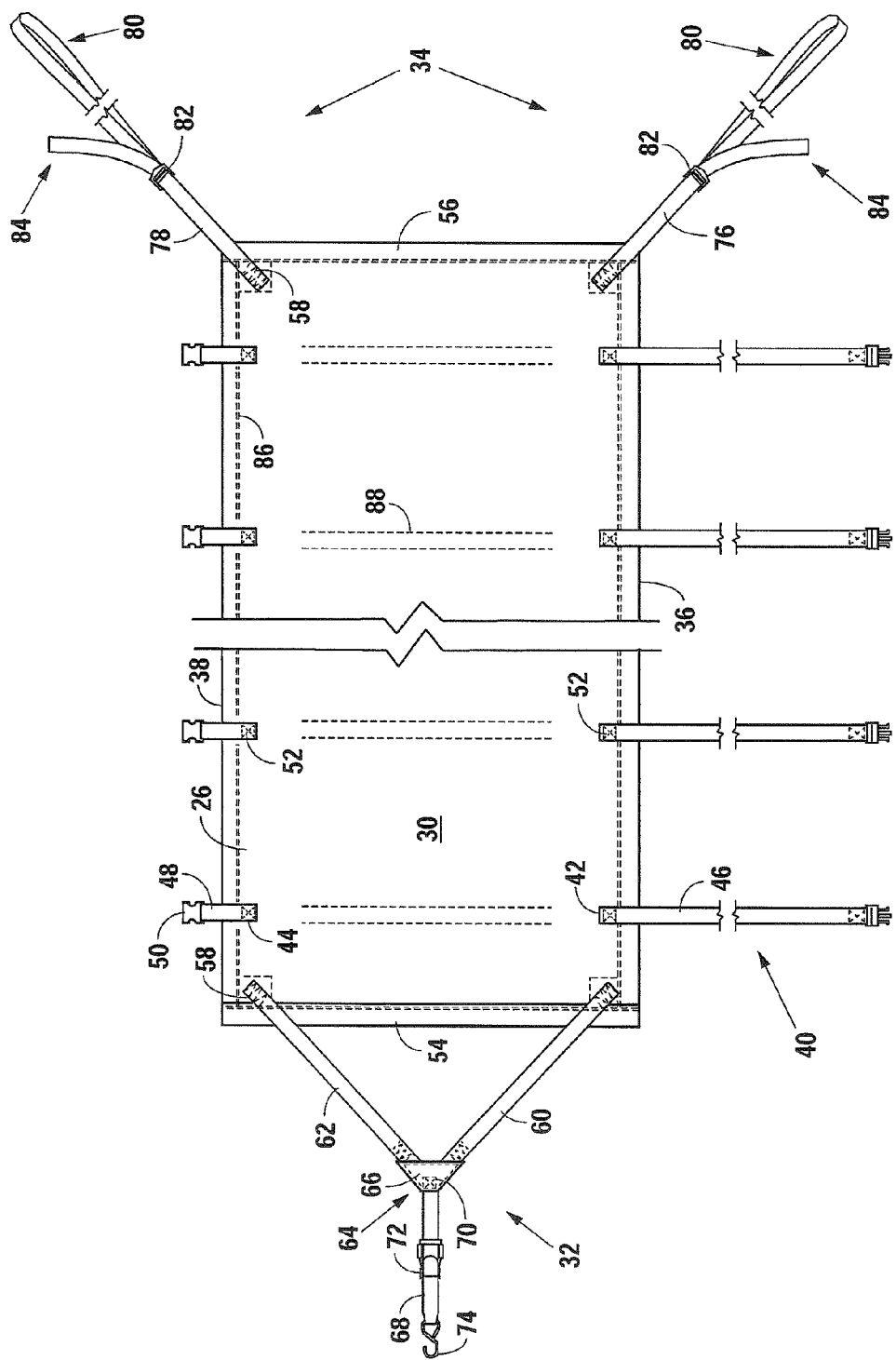
FIG. 2 is a top plan view of the preferred embodiment of the shade cover of the present invention.

In FIG. 2, the sheet 26 is shown in a top plan view, however, the normally convex surface 30 is not convex because the sheet 26 is flattened in this view. The sheet 26 has a first side boundary 36 and a second side boundary 38 opposite each other. One or more straps 40 are attached to the sheet 26 at a first strap attachment location 42 and at a second strap attachment location 44. The first and second strap attachment locations 42, 44 are oriented on the sheet 26 so that the straps 40 extend in a generally lateral direction across the sheet 26. The first and second strap attachment locations 42, 44 may be on the upper surface 30 of the sheet 26 as shown in FIG. 2 or could be located elsewhere on the sheet 26. For example, one or both strap attachment locations 42, 44 may be at the first and second boundaries 36, 38 in alternative embodiments.

Figure 3:
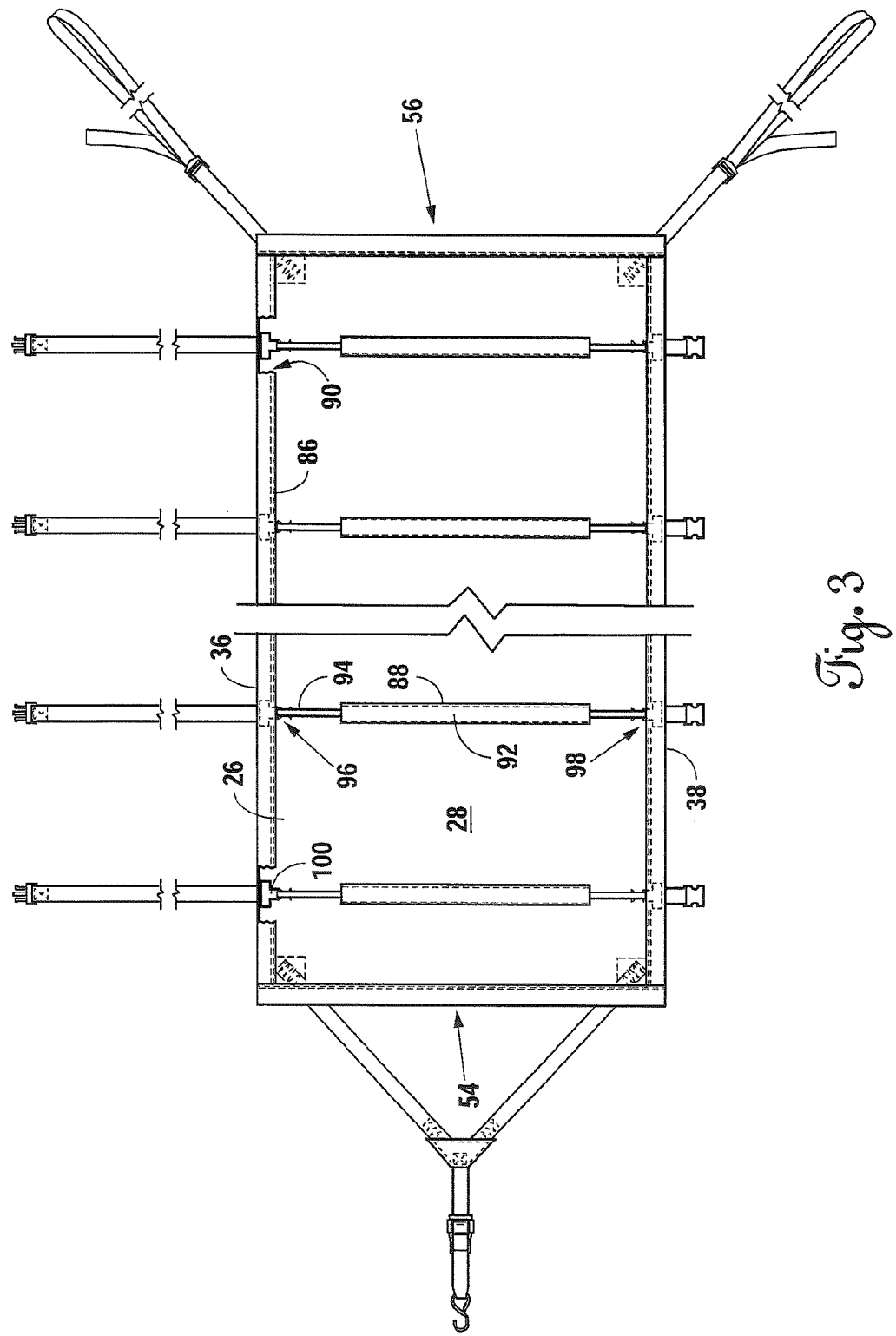
FIG. 3 is a bottom plan view of the preferred embodiment of the shade cover of the present invention.

Each of the straps 40 preferably has a first length 46 extending over the first side boundary 36 and a second length 48 extending over the second side boundary 38. The second length 48 may have a buckle 50 or some other connecting means like a hook (e.g., snap hook, S-hook), carabineer, or any other structural member for connecting the first and second lengths 46, 48 to each other. For example, one type of buckle 50 is shown in FIG. 2 while another type of buckle 50 (i.e., an adjustable side release buckle) is shown in FIG. 3. Referring back to FIG. 2, the first and second lengths 46, 48 are sewn to the sheet 26 with a box stick 52 or other suitable stitching at the first and second strap attachment locations 42, 44, respectively. Alternatively, the first and second lengths 46, 48 may be secured to the sheet 26 in some other manner.

A front end 54 and a rear end 56 of the sheet 26 extend between its first and second side boundaries 36, 38. Although the sheet 26 is shown as a rectangle, with the front and rear ends 54, 56 and first and second side boundaries 36, 38 all being a straight edge, the sheet 26 may be shaped differently. Preferably, the width of the flattened sheet 26 is shaped similar to, though slightly larger than, the width of the roof 22 of the trailer body 12.

The first and second stability strap systems 32, 34 are shown affixed to the upper surface 30 of the sheet 26 with stitching 58. Alternatively, one or both of the strap systems 32, 34 may be affixed to the lower surface 28 of the sheet 26. Preferably, the first stability strap system 32 has a first strap member 60 and a second strap member 62 each with one end affixed to the upper surface 30. The first and second strap members 60, 62 extend from the front end 54 of the sheet 26 and converge toward each other. The first and second strap members 60, 62 join at a vertex 64 and are sewn to a trapezoidal piece of material 66 for strength. Alternatively, a differently shaped piece of material may be used, or, the strap members 60, 62 may be directly affixed to each other.

Extending from the vertex 64 is a trailer-tongue attachment strap 68. The trailer-tongue attachment strap 68 is affixed to the trapezoidal piece of material 66 with a box stitch 70 but other stitch patterns may be used. The trailer-tongue attachment strap 68 is preferably a ratchet-style strap with a ratchet 72 that allows for length adjustment as well as for tightening the shade cover 24 against the roof 22. Alternatively, other types of adjustable straps may be used or the first stability strap system 32 may be custom fit depending on the make and model of the RV. The trailer-tongue attachment strap 68 preferably terminates with an "S" hook 74 or other termination hardware.

The second stability strap system 34 also preferably has first and second strap members 76, 78 extending from the rear end 56 of the sheet 26, though more or less strap members may be present. The first and second strap members 76, 78 may be adjustable or may be custom fit depending on the make and model of the recreational vehicle. In the preferred embodiment, the first and second strap members 76, 78 are doubled back to create a loop 80 and inserted through a strap adjuster 82. The length of the strap members 76, 78 can be shortened by pulling on an end 84 of the strap members 76, 78 and lengthened by canting the strap adjuster 82 with respect to the strap members 76, 78. Alternatively, the first and second strap members 76, 78 of the second stability strap system 34 may be a ratchet-style strap.

Also shown in FIG. 2 is stitching 86 around the sheet 26 and stitching 88 in the interior of the sheet 26. The stitching 86, 88 is for elements appearing on the lower surface 28 of the sheet 26, which are shown in FIG. 3. Referring to FIG. 3, the sheet 26 is shown in a bottom plan view; however, the normally concave lower surface 28 is not concave because the sheet 26 is flattened in this view. At the first and second side boundaries 36, 38 and the front and rear ends 54, 56 of the sheet 26, the material is folded back on itself and stitched to form a reinforced edge of the sheet 20. The stitching 86 affixes the edges of the material and a pocket 90 is created around the sheet 26. The stitching 88 on the interior of the sheet 20 affixes sleeves 92 along the lower surface 28.

Figure 4:
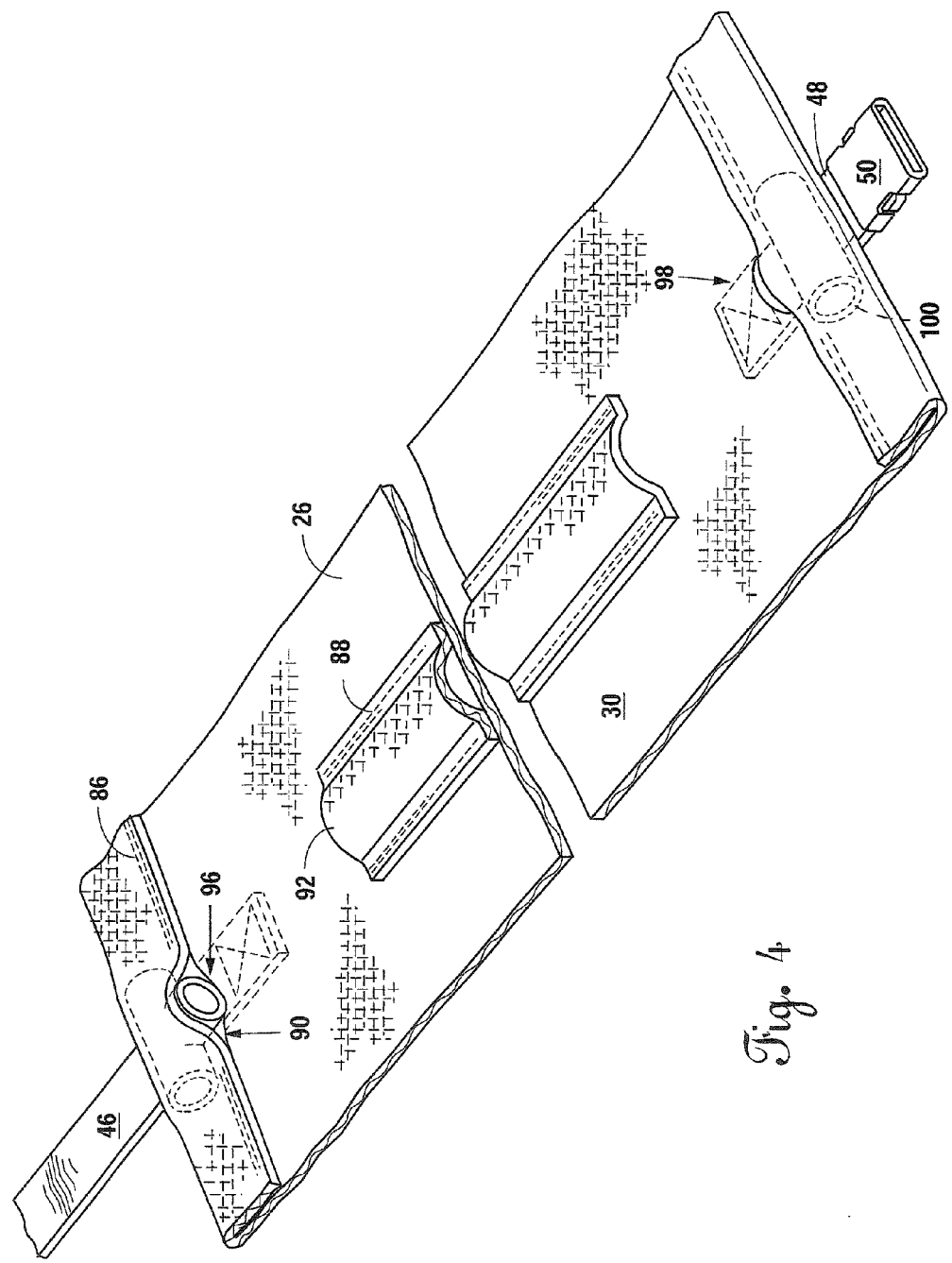
FIG. 4 is a partial section perspective view showing the preferred sleeve along the lower surface of the sheet between the first and second rod attachment locations.

One or more support rods 94 are attached to the sheet 26, extending between a first rod attachment location 96 and a second rod attachment location 98. The first and second rod attachment locations 96, 98 are located where the support rods 94 attach to the sheet 26. In the preferred embodiment, the first and second rod attachment locations 96, 98 are positioned at the first and second side boundaries 36, 38 of the sheet 26 where the T-shaped polyvinyl chloride (PVC) pipe connecting sleeves 100 are positioned within the pocket 90 as shown in FIG. 4. Alternatively, the connecting sleeves 100 may not be T-shaped, or, there may be alternative methods of attachment for the support rods 94. For example, if they were grommets and the support rods 94 may be inserted into grommets or simply a reinforced pocket in the material (not shown).

Referring back to FIG. 3, the support rods 94 extend through the sleeves 92 and along the lower surface 28. The first and second rod attachment locations 96, 98 are positioned along the first and second side boundaries 36, 38 of the sheet 26. Alternatively, the first and second rod attachment locations 96, 98 may be elsewhere on the lower surface 28. Or, as an even further alternative, the first and second rod attachment locations 96, 98 may be on the upper surface 30, with the support rods 94 extending along the upper surface 30, possibly through sleeves 92 located on the upper surface 30 (not shown).

Figure 5:
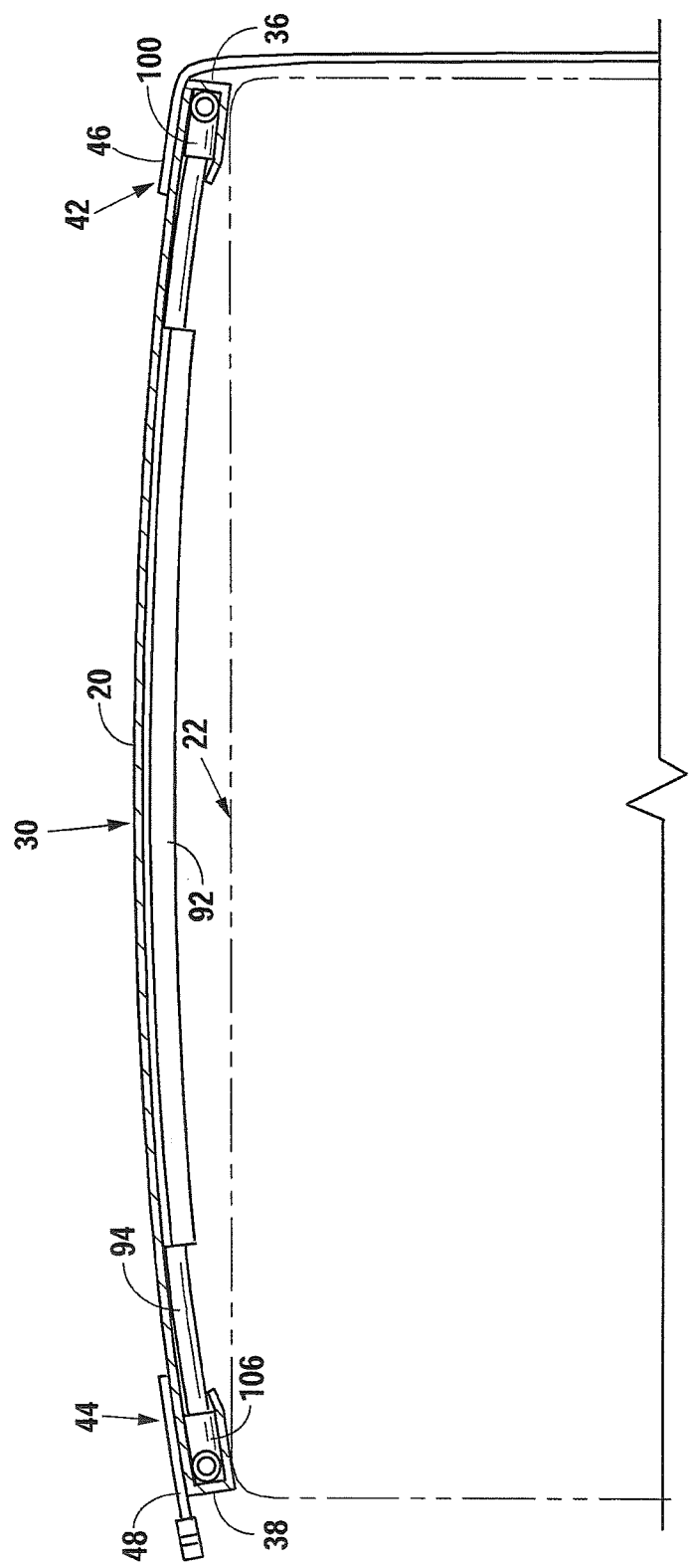
FIG. 5 is cross-section side view of the shade cover on the roof of the trailer body prior to connecting the straps.
Figure 6:
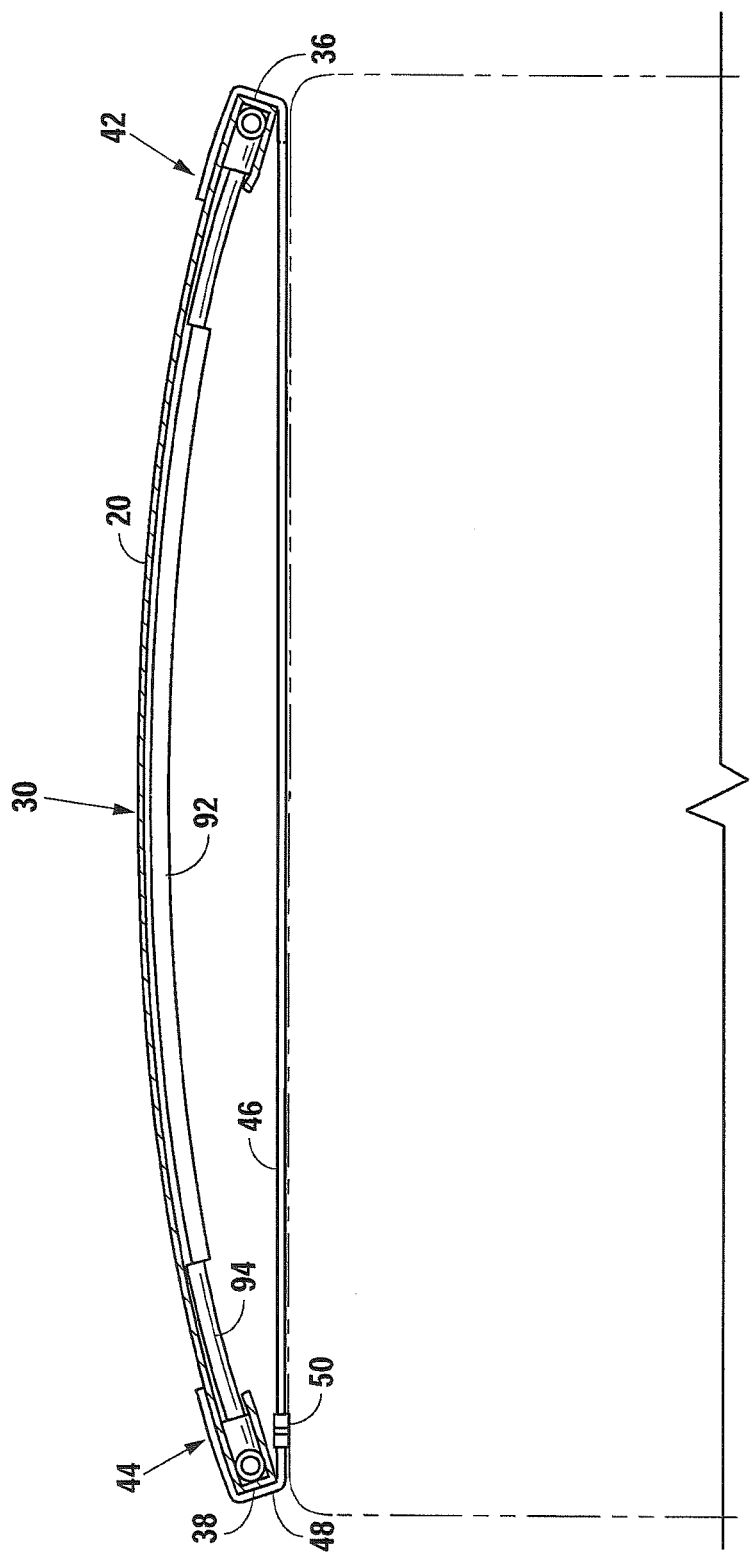
FIG. 6 is a cross-section side view of the shade cover on the roof of the trailer body after connecting the straps.

When the first and second lengths 46, 48 of the straps 40 are connected and the shade cover 14 is installed, the support rods 94 maintain the curved shape of the sheet 26. The support rods 94 are preferably made from PVC pipe or a similarly resilient material. As shown in FIGS. 5 & 6, as the support rods 94 are bent into a curved shape, the sheet 20 follows the curvature of the support rods 94 and forms a curved sheet surface. When the first and second lengths 46, 48 of the straps 40 are connected with the buckle 50 the support rods 94 and the sheet 20 are then held in the curved shape. FIG. 5 shows the straps 40 prior to connecting the first and second lengths 46, 48 while FIG. 6 shows the straps 40 after the lengths 46, 48 are connected. The first and second lengths 46, 48 extend from the first and second strap attachment locations the convex surface 30 around the first and second side boundaries 36, 38 of the sheet 20.

Preferably, each of the straps 40 is linearly aligned with one of the support rods 94 as shown in FIG. 3 so that when the first and second lengths 46, 48 of the straps 40 are connected each of the straps 40 and its corresponding support rod are positioned in the same vertical plane. Alternatively each of the straps 40 could be offset from its corresponding support rod; however, each of the straps 40 would still preferably extend in the same general direction as its corresponding support rod. As such, the curved shape is prevented from twisting when the first and second lengths 46, 48 are connected.

Figure 7:
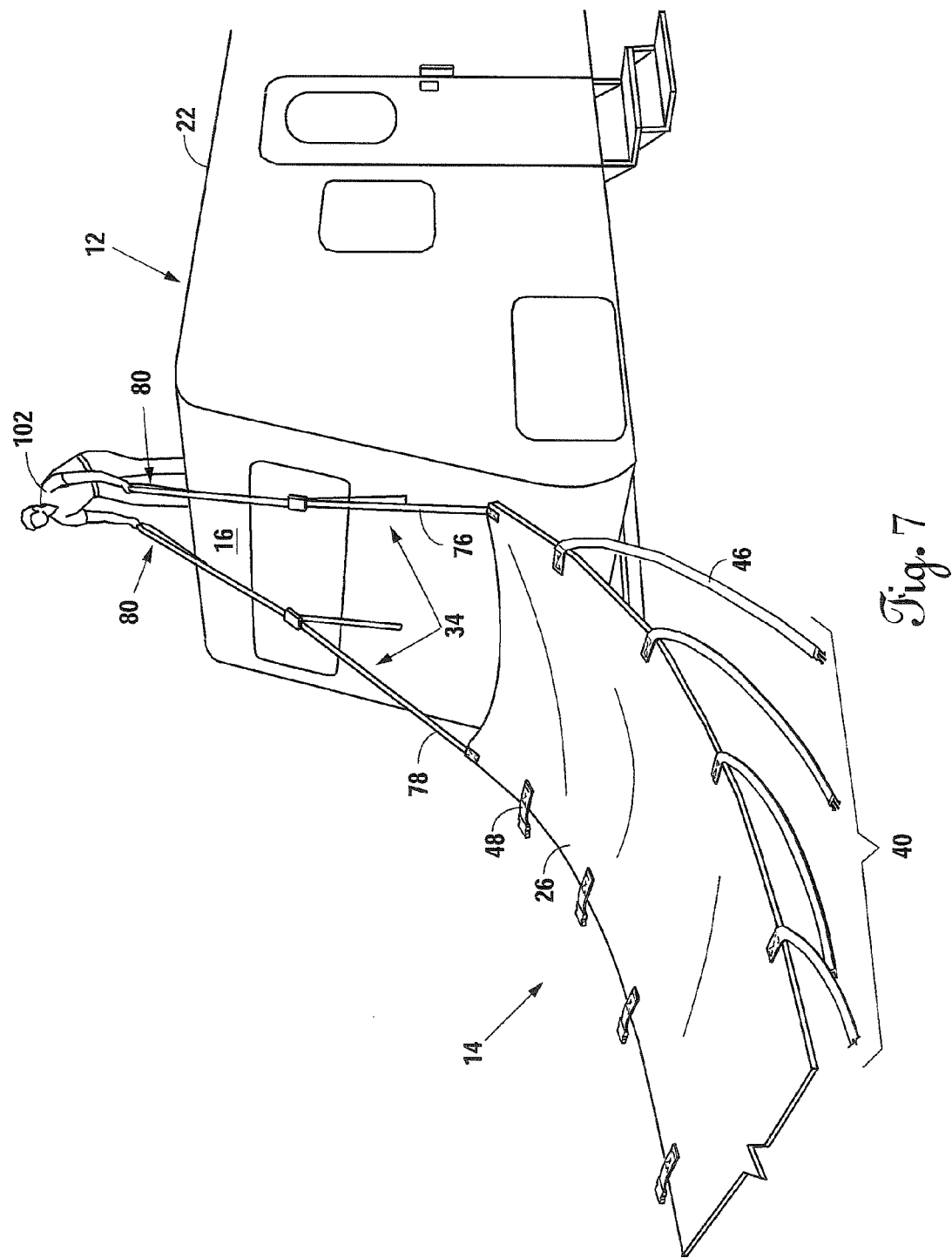
FIG. 7 is a perspective view showing the shade cover being pulled over the front end of the trailer body during one state of installation.

FIG. 7 shows the shade cover 14 being installed on the trailer body 12. A person 102 grabs the loops 80 on the first and second strap members 76, 78 of the second stability strap system 34 and pulls the sheet 26 onto the roof 22 from the front end 16 of the trailer body 12. The first and second lengths 46, 48 of each of the straps 40 are unconnected for this step. The person 102 pulls the shade cover 14 toward the rear end 18 of the trailer body 12 so that the sheet 26 covers the roof 22 as shown in FIG. 8.

Figure 8:
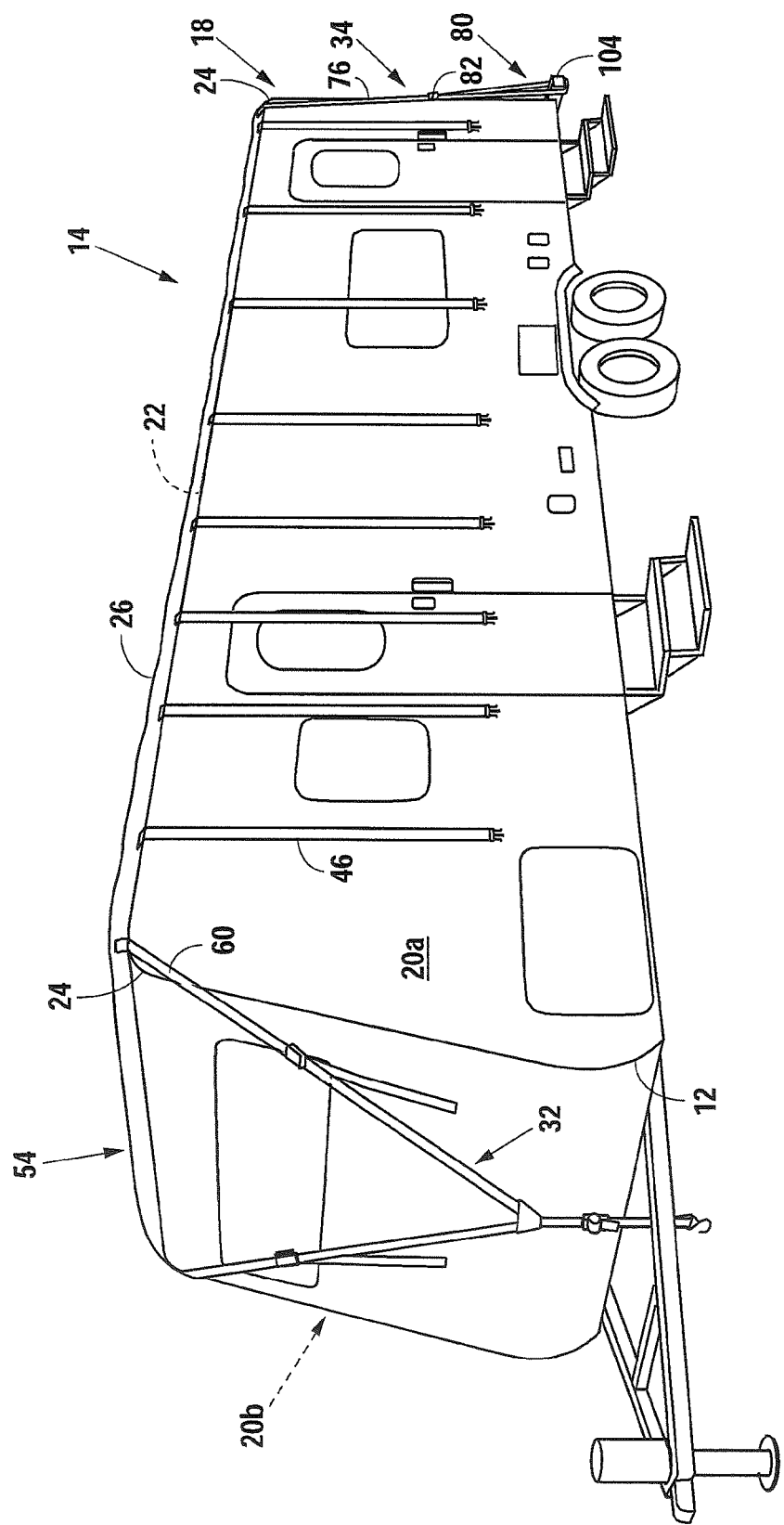
FIG. 8 is a perspective view showing the shade cover on the roof of the trailer during another stage of installation.

Referring to FIG. 8, the first length 46 of each of the straps 40 hangs from the sheet 26 and awaits connection with the second length 48. The first stability strap system 32 also hangs from the front end 54 of the sheet 26, while the second stability strap system 34 has been attached to a bumper 104 at the rear end 18 of the trailer body 12. In this regard, the loop 80 on the first strap member 76 of the second stability strap system 34 can be seen around the bumper 104 in FIG. 8 while the loop 80 on the second strap member 78 can be seen around the bumper 104 in FIG. 10. Once looped over the bumper 104, the lengths of the first and second strap members 76, 78 can be adjusted at the strap adjuster 82 for optimal positioning of the shade cover 14 on the roof 22.

To achieve optimal positioning of the shade cover 14 on the roof 22, the first and second strap members 60, 62 of the first stability strap system 32 and the first and second strap members 76, 78 of the second stability strap system 34 are each positioned so that a portion of each strap 60, 62, 76, 78 extends around a corner 24 of the trailer body 12. In FIG. 8, the first strap member 60 of the first stability strap system 32 and the first strap member 76 of second stability strap system 34 are both shown extending around their respective corners 24. In FIG. 10, the second strap members 62, 78 of the first and second stability strap systems 32, 34 can both be seen extending around their respective corners 24. Once each of the strap members is retained around its respective corner 24, the first and second strap members 60, 62 of the first stability strap system 32 are shortened using strap adjusters 112. Shortening the strap members 60, 62 pulls the front end 54 of the sheet 20 toward the roof 22 and prevents it from moving laterally across the roof 22.

With the shade cover 14 positioned as described, the first and second lengths 46, 48 of the straps 40 are connected as shown and discussed with regard to FIGS. 5 & 6. To do this, the person 102 positions a ladder (not shown) at one of the first lengths 46 which hangs from the roof 22 as shown in FIG. 8. The person 102 lifts the sheet 20 and throws the first length 46 across the roof 22 toward the other side 20*b* of the trailer body 12 and moves the moves the ladder to the next first length 46. Once each first length 46 has been thrown to the other side 20*b*, the ladder is positioned on the other side 20*b* and the person 102 connects each first length 46 to its respective second length 48, thereby attaining curved shape of the sheet 20 as previously described.

Figure 9:
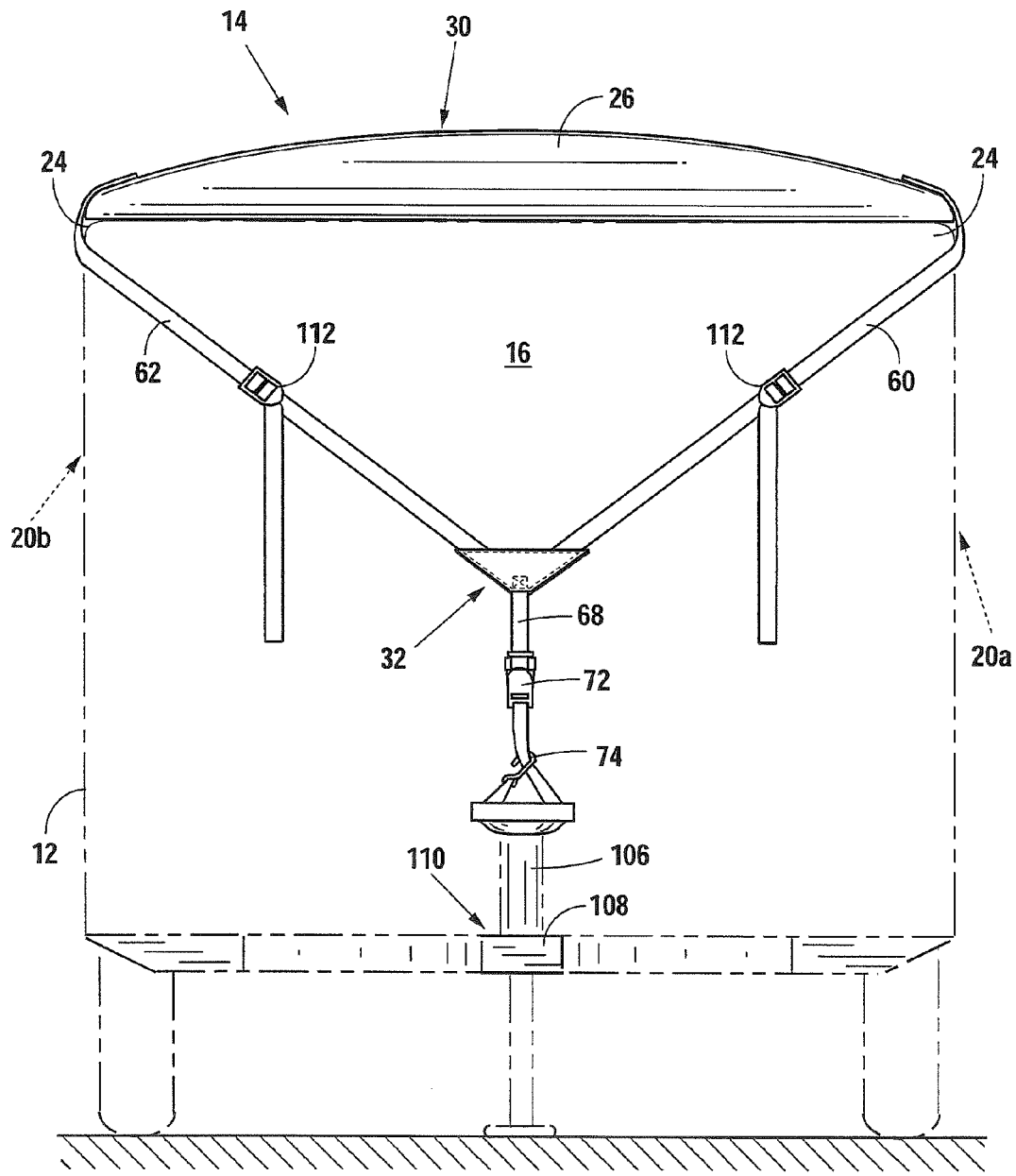
FIG. 9 is an end view of the present invention during installation after connecting the first stability strap system to the trailer tongue at the front end of the trailer body.

Referring now to FIG. 9, the trailer-tongue attachment strap 68 is wrapped around a vertical portion 106 of a trailer tongue 108 with the S-hook 74 around the strap 68 while the sheet 20 is in the curved shape. Alternatively, the trailer tongue attachment strap 68 may be wrapped around a horizontal portion 110 of the trailer tongue 108, or, as an even further alternative, the S-hook 74 may be hooked into part of the trailer tongue 108 or otherwise secured to the trailer body 12. Once secured to the trailer body 12, the trailer-tongue attachment strap 68 is ratcheted down using the ratchet 72. Ratcheting down the trailer-tongue attachment strap 68 tightens the first stability strap system 32 and acts to secure the shade cover 14 toward the roof 22.

FIG. 10, depicts the shade cover 14 fully installed and secured to the roof 22 so that lateral and vertical movement of the shade cover 14 is prohibited. Each of the first and second stability strap systems 32, 34 extends are positioned and secured as previously described. Peaks 114 can be seen along the convex surface 30 where the support rods 94 are located under the sheet 26 and the ends to the straps 40 can be seen.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

The invention claimed is:

1. A recreational vehicle rooftop shade system comprising:

a trailer body of a recreational vehicle having a front end, a rear end opposite of said front end, and opposing sides extending between said front end and said rear end, and a roof;

a rear bumper extending from the rear end of said trailer body; and, a trailer tongue extending from the front end of said trailer body;

a sheet of flexible material having a lower surface facing at least a portion of said roof of said trailer body and elevated from at least a portion of said roof;

said sheet having a front end, a rear end, and opposing first and second side boundaries extending between said front end and said rear end;

at least one strap affixed to said sheet and extending under said lower surface of said sheet between the first and second side boundaries;

at least one support rod extending along said sheet, said support rod maintaining the elevation of said lower surface from said roof;

a first stability strap system attached proximal to said front end of said sheet and securing said sheet to said recreational vehicle, said first stability strap system having a first strap member with an upper end attached proximal to the front end of said sheet and a second strap member having an upper end attached proximal to the front end of said sheet;

a second stability strap system attached proximal to said rear end of said sheet and securing said sheet to said recreational vehicle;

wherein the first strap member of the first stability strap system extends from said sheet at least partially around a first front corner of said trailer body, said first front corner being formed by at least the front end and one of the opposing sides of said trailer body; and wherein the second strap member of the first stability strap system extends from said sheet at least partially around a second front corner of said trailer body, said second front corner being formed by at least the front end and one of the opposing sides of said trailer body.

2. The recreational vehicle rooftop shade system of claim 1 wherein said first stability strap system further comprises a trailer tongue attachment strap having a lower end attached to said trailer tongue and an upper end attached to lower ends of said first and second strap members at a vertex.

3. The recreational vehicle rooftop shade system of claim 1 wherein said second stability strap system further comprises first and second strap members each having an upper end attached proximal to the rear end of said sheet and each having a lower end attached to said rear bumper;

wherein the first strap member of the second stability strap system extends from said sheet at least partially around a first rear corner of said trailer body, said first rear corner being formed by at least the rear end and one of the opposing sides of said trailer body; and wherein the second strap member of the second stability strap system extends from said sheet at least partially around a second rear corner of said trailer body, said second rear corner being formed by at least the rear end and one of the opposing sides of said trailer body.

4. The recreational vehicle rooftop shade system of claim 1 wherein said first side boundary of said sheet is positioned adjacent the intersection of said roof and one of the opposing sides of said trailer body and said second side boundary of said sheet is positioned adjacent the intersection of said roof and the other of the opposing sides of said trailer body.

5. The recreational vehicle rooftop shade system of claim 4 wherein the length from the front end to the rear end of said sheet is approximately the length of the roof of the trailer body from the front end to the rear end.

6. The recreational vehicle rooftop shade system of claim 1 wherein said sheet is in a generally curved shape and said support rod maintains the curved shape of the sheet.

7. The recreational vehicle rooftop shade system of claim 6 wherein said strap and said support rod are positioned in the same vertical plane.

8. The recreational vehicle rooftop shade system of claim 7 wherein said at least one strap is a plurality of straps and said at least one support rod is a plurality of support rods and, wherein each of said straps has a corresponding support rod positioned in the same vertical plane.

9. The recreational vehicle rooftop shade system of claim 2 the trailer tongue attachment strap further comprises a ratchet between the lower end and the upper end.

10. The recreational vehicle rooftop shade system of claim 1 wherein the first and second front corners are each formed by the front end, the roof, and one of the opposing sides of said trailer body.

11. The recreational vehicle rooftop shade system of claim 3 wherein the first and second rear corners are each formed by the rear end, the roof, and one of the opposing sides of said trailer body.

* * * * *